(12) United States Patent
Smith

(10) Patent No.: US 9,139,241 B1
(45) Date of Patent: Sep. 22, 2015

(54) VEHICLE DRAG REDUCTION DEVICE

(71) Applicant: Jeffrey P. Smith, Prosper, TX (US)

(72) Inventor: Jeffrey P. Smith, Prosper, TX (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 14/517,708

(22) Filed: Oct. 17, 2014

(51) Int. Cl.
*B62D 35/02* (2006.01)
*B62D 35/00* (2006.01)

(52) U.S. Cl.
CPC ............ *B62D 35/008* (2013.01); *B62D 35/001* (2013.01); *B62D 35/02* (2013.01)

(58) Field of Classification Search
CPC .. B62D 35/001; B62D 35/002; B62D 35/008; B62D 35/02; B62D 37/02
USPC ........... 296/180.1, 180.2, 180.3, 180.4, 180.5
See application file for complete search history.

(56) References Cited

U.S. PATENT DOCUMENTS

| | | | |
|---|---|---|---|
| 4,611,847 A | | 9/1986 | Sullivan |
| 4,746,160 A | * | 5/1988 | Wiesemeyer ............... 296/180.2 |
| 5,947,520 A | * | 9/1999 | McHorse ..................... 280/848 |
| 6,974,178 B2 | | 12/2005 | Ortega |
| 7,740,303 B2 | | 6/2010 | Wood |
| 7,780,223 B2 | | 8/2010 | Kottenstette |
| 7,950,721 B1 | | 5/2011 | Peterson |
| 8,186,745 B2 | | 5/2012 | Graham |
| 8,303,025 B2 | | 11/2012 | Senatro |
| 8,366,180 B2 | | 2/2013 | Lee |
| 8,376,450 B1 | * | 2/2013 | Long et al. ................. 296/180.4 |
| 8,398,150 B2 | | 3/2013 | Brown |
| 8,408,570 B2 | | 4/2013 | Heppel |
| 8,449,017 B2 | | 5/2013 | Boivin |
| 2011/0192664 A1 | | 8/2011 | Fox |
| 2012/0032475 A1 | | 2/2012 | Grandominico |
| 2012/0153668 A1 | | 6/2012 | van Raemdonck |
| 2013/0106135 A1 | | 5/2013 | Praskovsky |

OTHER PUBLICATIONS

"On Aerodynamics: The Effect of Aerodynamics on Tractor Trailers," Freight Wing Incorporated, <http://freightwing.com/on-aerodynamics.php> [retrieved Oct. 9, 2013], 3 pages.
"SmartWay Technology Program: Verified Aerodynamic Technologies," Sep. 17, 2013, United States Environmental Protection Agency, <http://www.epa.gov/smartway/technology/aerodynamics.htm> [retrieved Oct. 9, 2013], 3 pages.

* cited by examiner

*Primary Examiner* — Jason S Daniels
(74) *Attorney, Agent, or Firm* — Christensen O'Connor Johnson Kindness PLLC

(57) ABSTRACT

An aerodynamic component is provided in the form of one or more ground skirt sections attached to one or more underbody fairings (e.g., trailer side skirts, tractor side fairings, etc.) of a vehicle. In use, the ground effects skirt sections improve air flow underneath the vehicle, thereby reducing drag.

12 Claims, 5 Drawing Sheets

VEHICLE DRAG REDUCTION DEVICE

BACKGROUND

Numerous means have been sought to improve the fuel-efficiency of moving bodies and, especially, moving bluff bodies by reducing their aerodynamic drag. In the field of surface transportation, and particularly in the long-haul trucking industry, even small improvements in fuel efficiency can reduce annual operating costs significantly. It is therefore advantageous in the design of a vehicle to reduce drag forces, thereby increasing the aerodynamic properties and efficiency of the vehicle.

The over-the-highway cargo-hauling tractor-trailer combination is one vehicle that experiences excessive aerodynamic drag. Generally described, tractor-trailer combinations typically include a tractor having a so-called fifth wheel by which a box-like semi-trailer may be attached to the tractor by an articulated connection for transportation of the cargo trailer. In addition to the gap between the tractor and trailer and the space behind the trailer rear doors, other areas around the combination generate drag as the combination traverses across the ground. Some of these areas include the undercarriage of the tractor and/or trailer, which is comprised of groupings of various drag-producing components. These drag-producing components of a tractor-trailer undercarriage customarily include axles, mud flaps, tires, and other components, such as brake components, suspension components, and longitudinal and transverse structural support members well known in the art, etc.

Most large long-haul tractor-trailer combinations similar to those described above exhibit less than optimal aerodynamic performance during highway operation. At highway speeds, these conventional combinations develop a substantial amount of turbulent airflow in and around the undercarriage thereof. This turbulence results in significant aerodynamic drag, increasing both fuel consumption and Nitrogen Oxide (NOx) emissions of the tractor.

SUMMARY

This summary is provided to introduce a selection of concepts in a simplified form that are further described below in the Detailed Description. This summary is not intended to identify key features of the claimed subject matter nor is it intended to be used as an aid in determining the scope of the claimed subject matter.

In accordance with an aspect of the present disclosure, an aerodynamic device is provided for attachment to a fairing of a vehicle. The device includes a device body having an upright leg and a cross leg arranged so as to form an inverted T in cross section. The cross leg of the inverted T in one embodiment is oriented generally perpendicular to the longitudinal axis of the vehicle. The upright leg is adapted to be connected to the bottom of the fairing.

In accordance with another aspect of the present disclosure, a fairing assembly is provided for reducing drag on an associated vehicle. The assembly includes a vehicle fairing having a free end and a skirt section coupled to the free end of the vehicle fairing. The skirt section is configured as a generally inverted T in cross section. The cross leg of the inverted T in one embodiment is oriented generally perpendicular to the longitudinal axis of the vehicle.

In accordance with another aspect of the present disclosure, a fairing assembly is provided for reducing drag on an associated vehicle. The fairing assembly includes a vehicle fairing having a free end and a skirt section coupled to the free end of the vehicle fairing. The skirt section is configured as a generally inverted T in cross section. The cross leg of the inverted T in one embodiment includes an outer leg segment and an inner leg segment that are oriented generally perpendicular to the longitudinal axis of the vehicle. In one embodiment, the skirt section is configured to flex between a stagnation position, wherein the cross member is positioned generally parallel with the ground surface, and an air flow position, wherein the cross member is tilted downwardly such that the outer leg segment is closer to the ground surface than the inner leg segment.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

Figure 1:
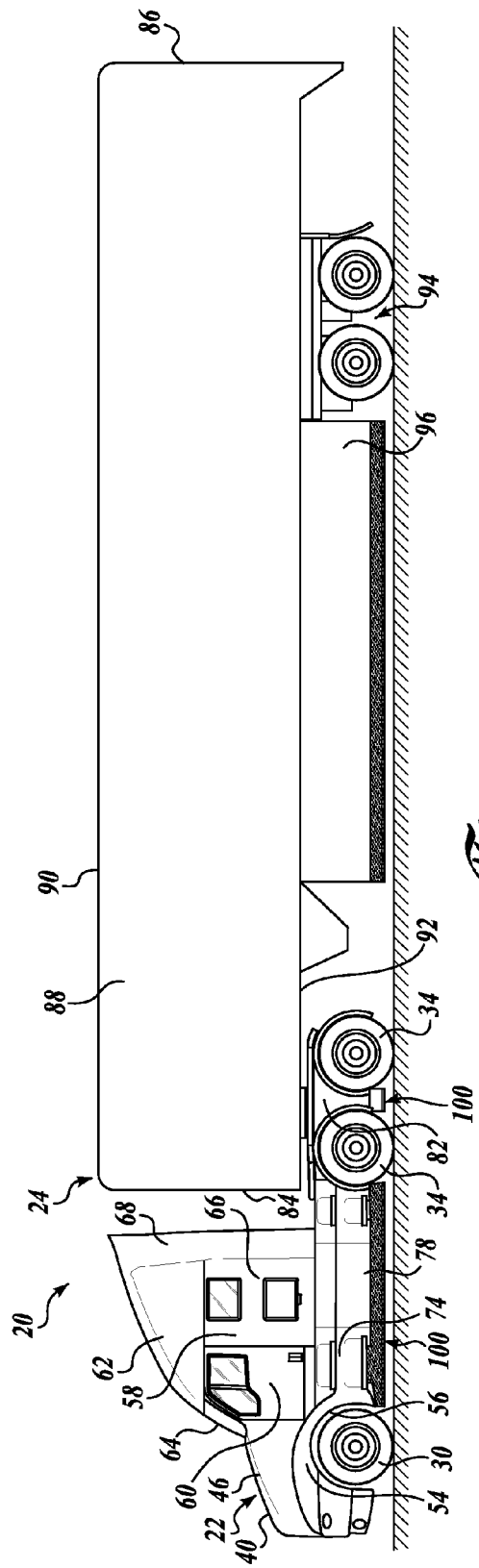
FIG. 1 is a side view of a vehicle, such as a tractor-trailer combination, employing one or more drag reducing devices in accordance with aspects of the present disclosure.

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The following discussion provides examples of devices or components for improving the aerodynamic efficiency (e.g., reduce drag) of vehicles, such as Class 8 tractors, trailers, combinations, etc. To improve the aerodynamic efficiency of a vehicle, the examples described herein provide one or more aerodynamic components or drag reducing devices positioned thereon. In some examples described herein, the one or more aerodynamic components are in the form of ground effects skirt sections attached to one or more underbody fairings (e.g., trailer side skirts, tractor side fairings, etc.) of a vehicle. In use, the ground effect skirt sections improve air flow underneath the vehicle, thereby reducing drag. As will be described in more detail below, the configuration of the ground effects skirt section in some embodiments improves vehicle aerodynamics in cross wind conditions. The devices or any combination of components hereinafter described may be installed on new vehicles or may be retrofitted on existing vehicles.

Although embodiments of the present disclosure will be described with reference to a Class 8 tractor-trailer combination, one skilled in the relevant art will appreciate that the disclosed embodiments are illustrative in nature and therefore should not be construed as limited to a Class 8 tractor and/or trailer. It should therefore be apparent that the disclosed systems and components thereof have wide application, and therefore may be suitable for use with many types of powered vehicles, such as passenger vehicles, buses, RVs, commercial vehicles, light and medium duty vehicles, and the like, as well as non-powered vehicles, such as cargo trailers, flatbed trailers, etc., and the like. Accordingly, the following descriptions and illustrations herein should not limit the scope of the claimed subject matter.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

FIG. 1 illustrates a left side view of a vehicle, such as a tractor-trailer combination 20, employing one or more examples of a ground effects skirt section, generally denoted 100, in accordance with aspects of the present disclosure. Before describing the various aspects of the ground effects skirt section 100, the tractor-trailer combination 20 will be described in some detail. As shown in FIG. 1, the combination 20 includes a lead vehicle 22 in the form of a heavy duty tractor and a trailing vehicle 24 in the form of a semi-trailer or trailer. The tractor 22 is articulatedly connected to a trailer 24 by a trailer coupling, such as, for example, a so-called fifth wheel, to form a tractor-trailer combination.

As shown in FIG. 1, the tractor 22 comprises a chassis (hidden in FIG. 1) supported by wheels 30 of a front wheel assembly and wheels 34 of a rear wheel assembly. The wheels 30 and 34 are connected to the chassis via drag-producing components, including conventional axles and suspension assemblies (not shown). In the embodiment shown in FIG. 1, the rear wheel assembly is of the dual-wheel, tandem-axle type.

A front section 40 of the vehicle 20 is supportably mounted on the chassis, as shown in FIG. 1. The front section 40 generally includes a hood 46 that generally covers a block-like shaped engine compartment housing an internal combustion engine that propels the tractor. In the embodiment shown, the hood is integrally formed with fenders 54, which define wheel wells 56 that house the wheels 30. The fenders 54 in this example may include integrally formed headlamp assemblies and side turn indicators (not shown).

The tractor 22 also includes a cab section 58 supportably mounted on the chassis rearwardly of the front section 40. The cab section 58 generally includes vertically oriented driver and passenger doors 60, a roof (hidden in FIG. 1 by a roof fairing 62), a windshield 64, and an optional sleeper section 66 that forms a compartment that houses driver and passenger seats, a dashboard with various gages, telematics, system controls, etc., a steering wheel for operating the tractor 20, and sleeping quarters if the optional sleeper section is included.

In the embodiment shown, the cab section 58 includes various aerodynamic devices, such as fairings, to improve the aerodynamics of the tractor. Examples of such fairings may include the roof fairing 62, which provides a smooth transition from the windshield 64 to the rear end of the cab section 58, as defined by a generally vertically oriented rear wall (hidden in FIG. 1). The tractor 20 may also include extender fairings 68 disposed at the trailing edges of the cab section 58.

The tractor 22 may also include one or more chassis fairings that aid in covering one or more structural aspects of the tractor, such as the gas tank, storage boxes, etc. The fairings provide improved air flow and aid in inhibiting air flow underneath the chassis. In the embodiment shown in FIG. 1, the one or more chassis fairings may include a front chassis fairing 74. The front chassis fairing 74 in some embodiments includes integrated steps for cab ingress/egress. Additional fairings, such as rear or quarter fender fairings, may be provided or integrally formed with the front chassis fairing 74. The one or more chassis fairings may also include a mid-chassis fairing(s) 78. The mid-chassis fairing(s) in some embodiments is hingedly coupled to the chassis for providing access to the gas tanks, compressed air tanks, storage boxes, hoses, etc. The one or more chassis fairings may optionally include a rear chassis fairing 82. The rear chassis fairing in some embodiments can form a fender-like structure that covers the wheels 34 of the rear wheel assemblies and can extend from the mid-chassis fairing 78 to the end of or aft of the chassis.

Still referring to FIG. 1, the trailer 24 includes a trailer body that defines a cargo carrying interior cavity (not shown). In the embodiment shown, the trailer body is generally rectangular in shape, having generally planar, vertically oriented front and rear end panels 84 and 86; generally planar, vertically oriented side panels 88; a generally planar top panel 90; and a generally planar bottom panel, sometimes referred to as a cargo-supporting floor deck 92.

The undercarriage of the trailer 24 is also comprised of groupings of various drag-producing components, which generally reside below a cargo-supporting floor deck 92. The drag-producing components of a semi-type cargo trailer undercarriage customarily include rear axles and wheels of the rear wheel assembly 94, and other components, such as brake components, suspension components, and longitudinal and transverse structural support members, not shown for ease of illustration but well known in the art. Similar to the tractor 22, the trailer 24 may include fairings, such as side skirt fairings 96, in order to provide improved air flow and aid in inhibiting air flow underneath the chassis.

Still referring to FIG. 1, one or more of the skirt sections 100 of the present disclosure are mounted or otherwise positioned adjacent the underside of one or more trailer fairings, such as side skirt fairings 96. FIG. 1 also depicts one or more skirt sections 100 mounted or otherwise positioned adjacent the underside of the tractor fairings, such as chassis fairings 74, 78, 82, etc. Each skirt section 100 may extend, for example, about 4-12 inches or more below the associated fairings to just proximal (e.g., about 4 inches or less) the ground surface. As such, each skirt section 100 extends the drag reduction benefits of the associated fairing while mitigating damage to such fairing from ground contact due to low clearance conditions.

FIG. 1 shows a plurality of skirt sections 100 positioned on the left side of a vehicle. It should be noted that the structures and arrangements of the depicted left-side skirt section 100A can be mirrors of the right-side skirt sections (not shown). Generally described, once mounted the left-side skirt sections 100 traverse longitudinally below the lateral boundaries (i.e., left and right side) of the tractor 22 and/or trailer 24, as shown in FIG. 1. Each skirt section 100 can be mounted to any respective component of the tractor or trailer in order to be disposed adjacent to and to extend beneath the associated tractor/trailer fairing. In some embodiments, each skirt section 100 extends the length of its associated fairing 74, 78, 82, 96, or portions thereof.

Figure 2:
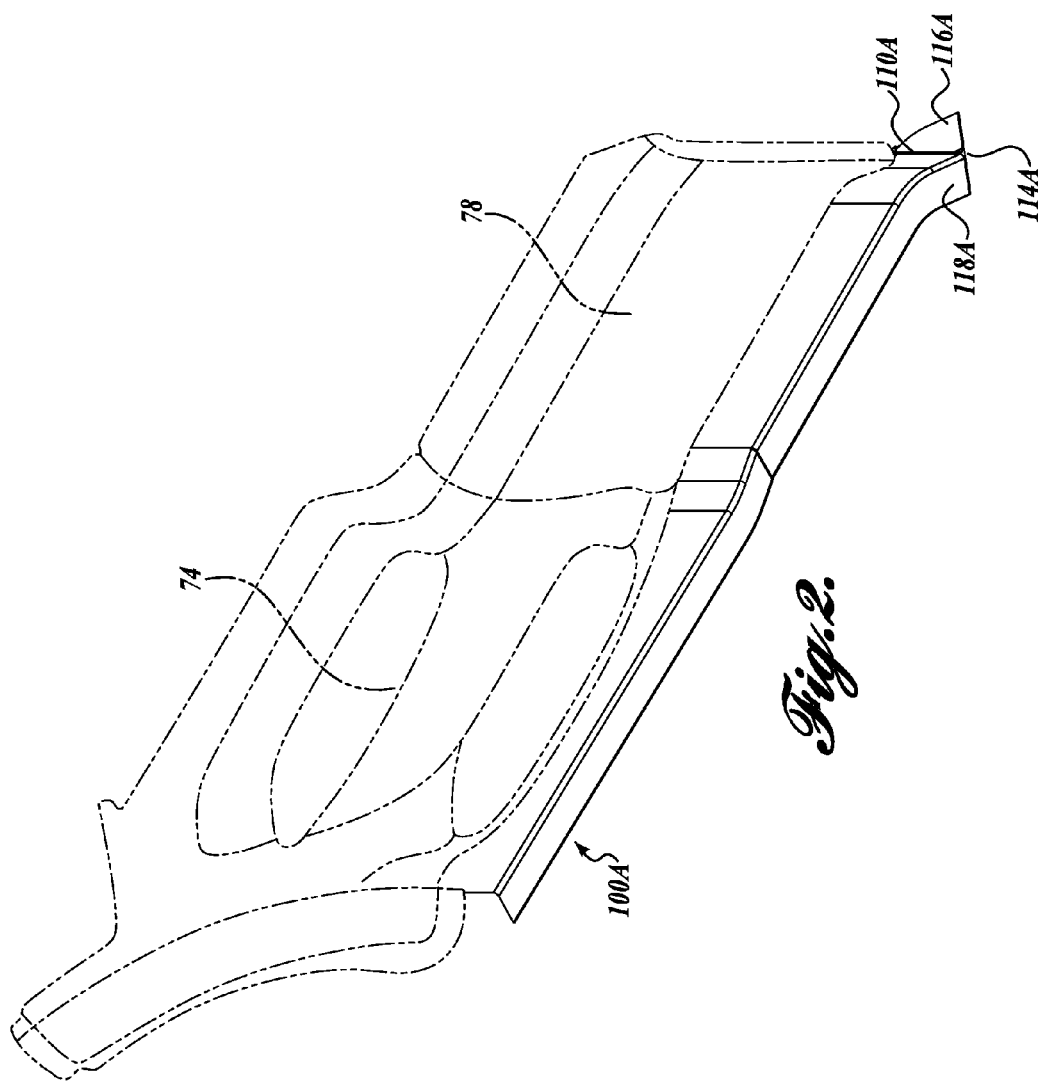
FIG. 2 is one example of the drag reducing device coupled to a vehicle fairing in accordance with aspects of the present disclosure.
Figure 4:
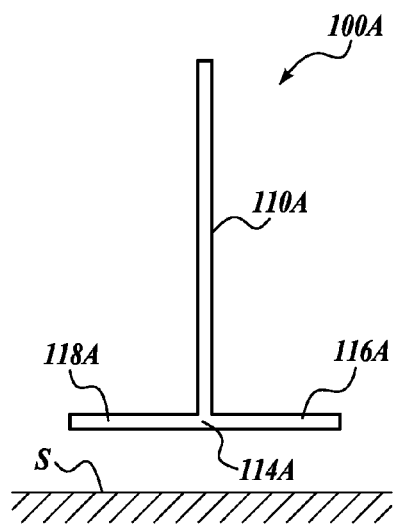
FIG. 4 is a schematic representation of an end view of the drag reducing device of FIG. 2.
Figure 6:
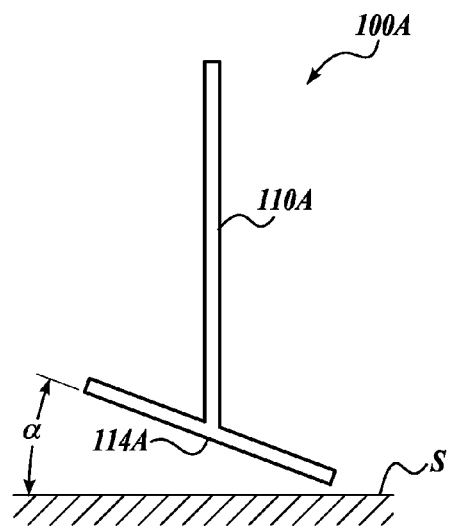
FIG. 6 is an end view of another embodiment of the drag reducing device in accordance with aspects of the present disclosure.

Turning now to FIG. 2, there is shown one example of a skirt section 100A mounted or otherwise positioned below the chassis fairings 74 and 78. In cross section and in end view, the skirt section 100A is configured as an inverted T, as shown in FIGS. 2 and 4. In that regard, the skirt section 100A includes a generally upright leg 110A and a transverse or cross leg 114A having inner and outer segments 116A and 118A, respectively. In some embodiments, the cross leg 114A is generally horizontal to the ground surface S over which the vehicle traverses when the skirt section is installed. In other embodiments, the cross leg 114A can be oriented at an angle α of between about 1 to 10 degrees, or greater, with respect to the ground surface S, as shown in FIG. 6. In these latter embodiments, the outwardly disposed end of the cross leg segment 116A is closer to the ground surface S than the inwardly disposed end of the cross leg segment 118A.

The ground effects skirt section 100 or sections thereof are generally flexible or semi-rigid, and can be constructed out of, for example, injected molded synthetic or natural rubber, Thermoplastic Polyolefin (TPO), or other similar thermoplastics, etc. Accordingly, the skirt section 100 is configured to flex or bend at one or more areas in the presence of cross winds or if struck by something associated with the ground surface. In some embodiments, the ends of segments 116A and/or 118A can be formed with either an upwardly or a downwardly rolled or turned lip (not shown). In one embodiment, the skirt section 100 or sections thereof are configured to flex when the side force of a 3-degree yaw is applied.

It will be appreciated that in some embodiments, the flexing characteristics or flexing profile of the ground effects skirt section 100 is a design parameter and can vary depending on the intended application of the skirt section 100. The flexing profile is dependent, at least in part, on thicknesses, material properties, etc., at various areas of the skirt section 100. For example, a dual, tri, etc., durometer extruded skirt section can be fabricated using injection nozzles at specific areas of the extrusion die. The upright leg 110A and/or the cross leg 114A can be uniform in thickness in some embodiments or can vary along their length in these or other embodiments. Similarly, the upright leg 110A and the cross leg 114A can be of a uniform material in some embodiments or can change along their length in these or other embodiments.

Figures 7, 8, 9, 10, 11:
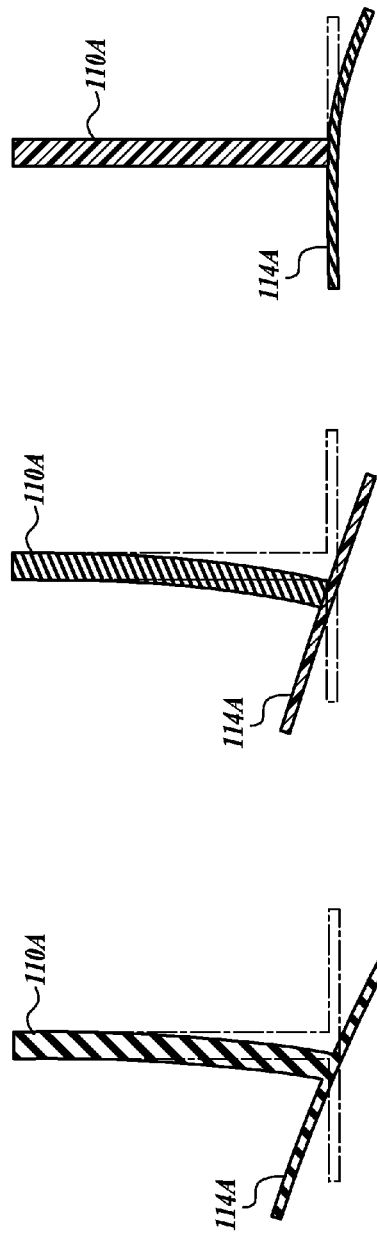
FIGS. 7-11 illustrate cross-sectional views of representative embodiments of the drag reducing device in accordance with one or more aspects of the present disclosure.

In one embodiment, the upright leg 110A and the cross leg 114A are extruded with or otherwise constructed of the same material, as shown in FIG. 7. In another embodiment, the upright leg 110A and the cross leg 114A are extruded with or otherwise constructed of materials having different hardness values. In one embodiment, the upright leg 110A is constructed out of a material softer than the cross leg 114A (FIG. 8), or vice versa (FIG. 9). In other embodiments, sections of the upright leg 110A are extruded with or otherwise constructed of materials having different hardness values, as shown in FIGS. 10 and 11. Similarly, sections of the cross leg 114A are extruded with or otherwise constructed of materials having different hardness values in some embodiments.

Figure 3:
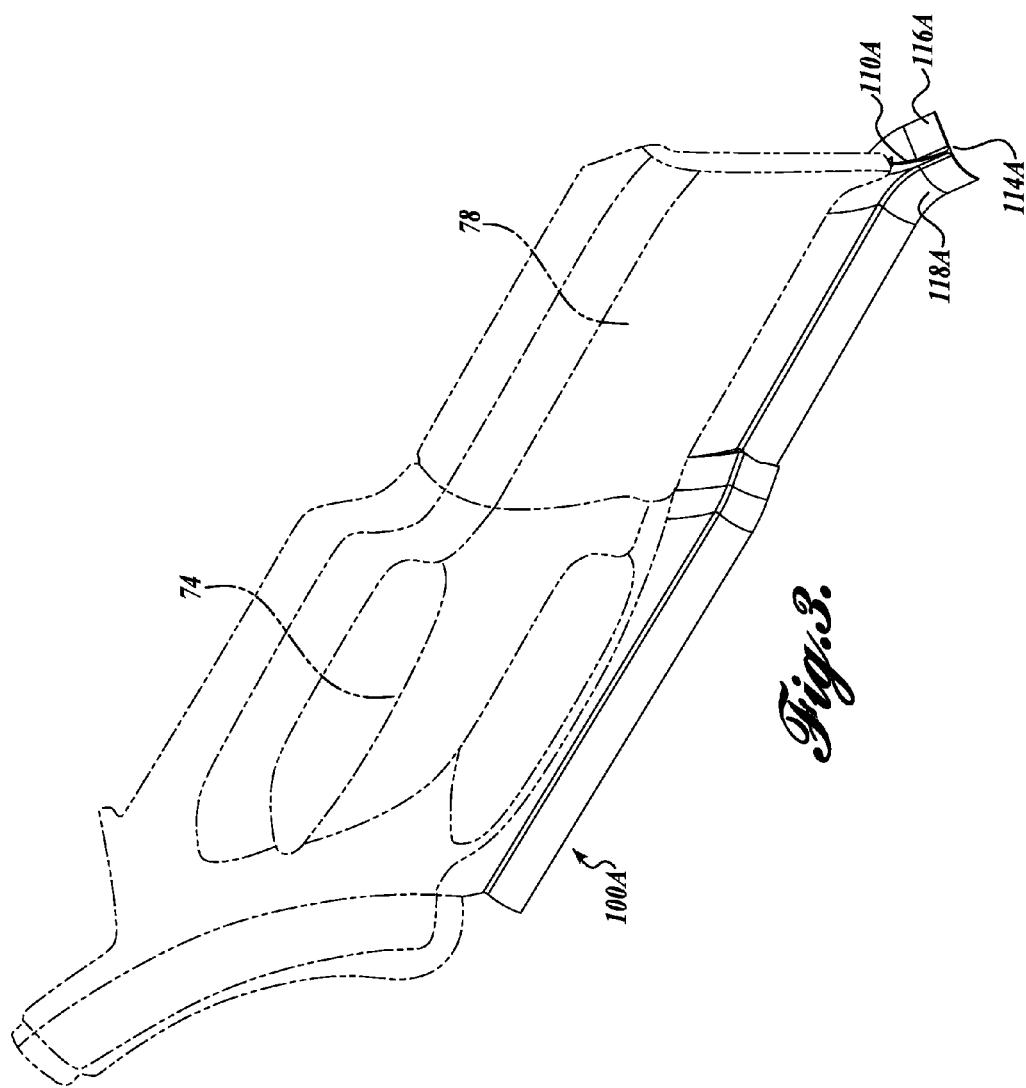
FIG. 3 illustrates one configuration of the drag reducing device of FIG. 2 in a cross-flow condition.
Figure 5:
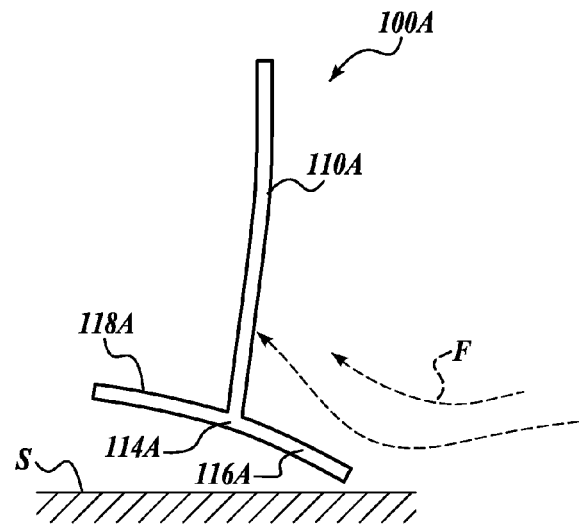
FIG. 5 is a schematic representation of an end view of the drag reducing device of FIG. 3.

Once installed, and with the tractor 22 moving in a forward direction, the skirt sections 100A experience air flow in the opposite direction of the forward movement of the vehicle. In this regard, the skirt sections provide improved air flow by at least blocking portions of the air flow from entering the under-body area of the vehicle, thereby reducing drag. In some embodiments, as the tractor 22 moves in a forward direction, the vehicle is subject to off-axis air flow F (FIG. 5) including but not limited to cross winds oriented at a yaw angle from the longitudinal axis of the vehicle. In this regard, the configuration of the skirt sections 100 improves the air flow characteristics of the associated vehicle by flexing (the degree of flexing dependent in part on the velocity of the cross wind and the rigidity of the skirt sections 100 described above) downwardly as shown in FIGS. 3 and 5, thereby reducing the gap between the skirt section 100 and the ground surface S. Thus, the flexibility of the skirt section 100 in conjunction with its inverted T-shaped cross section almost closes the gap with the ground in the presence of a strong cross wind, thereby reducing drag. The skirt section 100 is further configured to return to its at rest (i.e., stagnant air) position, substantially similar to that shown in FIGS. 2 and 4.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. An aerodynamic device for attachment to a fairing of a vehicle, comprising:
   a device body having an upright leg and a cross leg arranged so as to form an inverted T in cross section, wherein the cross leg of the inverted T is oriented generally perpendicular to a longitudinal axis of the vehicle, and wherein the upright leg is adapted to be connected to a bottom of the fairing.

2. The device of claim 1, wherein the device body is constructed out of a flexible or semi-rigid material.

3. The device of claim 1, wherein the cross leg is positioned perpendicular to the upright leg.

4. The device of claim 1, wherein the cross leg is positioned parallel with the ground surface when the device is attached to the fairing.

5. The device of claim 1, wherein the device body is configured to flex in air flow conditions such that an outwardmost end of the cross leg tilts downwardly toward a ground surface and away from the fairing.

6. The fairing assembly of claim 1, wherein the cross leg is positioned perpendicular to the upright leg.

7. The fairing assembly of claim 1, wherein the cross leg is positioned parallel with the ground surface.

8. A fairing assembly for reducing drag on an associated vehicle, comprising:

a vehicle fairing having a free end; and a skirt section coupled to the free end of the vehicle fairing, wherein the skirt section is configured as a generally inverted T in cross section, wherein a cross leg of the inverted T is oriented generally perpendicular to a longitudinal axis of the vehicle.

9. The fairing assembly of claim 8, wherein the skirt section is constructed out of a flexible or semi-rigid material.

10. The fairing assembly of claim 8, wherein the skirt section is configured to flex in air flow conditions such that an outwardmost end of the cross leg tilts downwardly toward a ground surface and away from the fairing.

11. The fairing assembly of claim 10, wherein the skirt section is configured to return to an unflexed configuration when air flow conditions become stagnant.

12. A fairing assembly for reducing drag on an associated vehicle, comprising:

a vehicle fairing having a free end; and a skirt section coupled to the free end of the vehicle fairing, wherein the skirt section is configured as a generally inverted T in cross section, wherein a cross leg of the inverted T includes an outer leg segment and an inner leg segment that are oriented generally perpendicular to a longitudinal axis of the vehicle, wherein the skirt section is configured to flex between a stagnation position, wherein the cross leg is positioned generally parallel with the ground surface, and an air flow position, wherein the cross leg is tilted downwardly such that the outer leg segment is closer to the ground surface than the inner leg segment.

* * * * *